Figure 1:
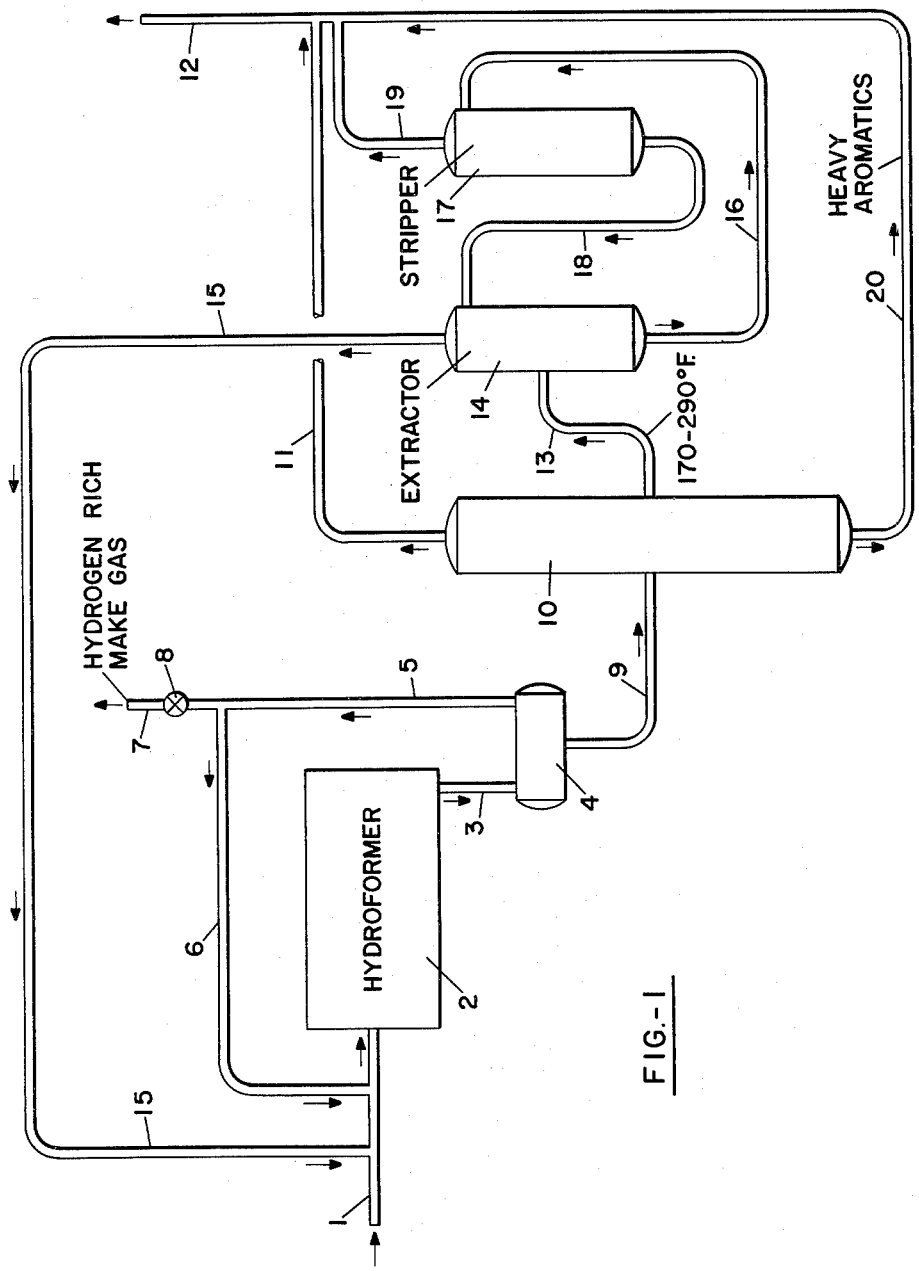

April 25, 1961  C. E. HEMMINGER ET AL  2,981,675
SUBSEQUENT TREATMENT OF A NAPHTHA REFORMATE
TO OBTAIN A HIGH OCTANE GASOLINE
Filed Dec. 23, 1957  3 Sheets-Sheet 1

Charles E. Hemminger
Donald D. MacLaren  Inventors

By *H. M. Feyrer*  Attorney

Charles E. Hemminger
Donald D. MacLaren
Inventors

By H. M. Feyrer Attorney

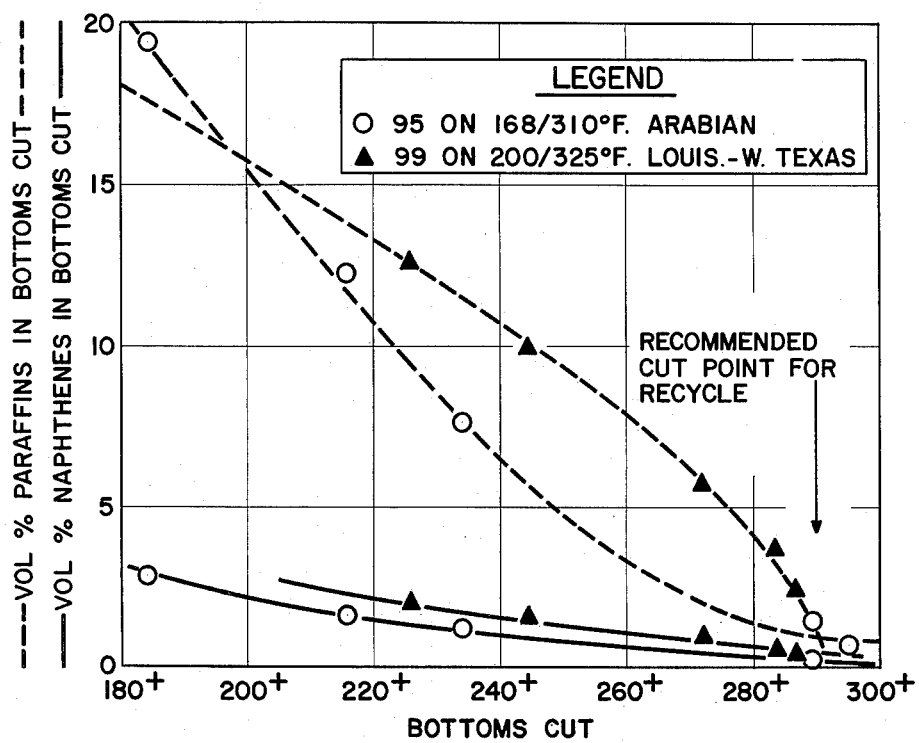

2,981,675
Patented Apr. 25, 1961

2,981,675

SUBSEQUENT TREATMENT OF A NAPHTHA REFORMATE TO OBTAIN A HIGH OCTANE GASOLINE

Charles E. Hemminger, Westfield, and Donald D. Mac-Laren, Scotch Plains, N.J., assignors to Esso Research and Engineering Company, a corporation of Delaware Filed Dec. 23, 1957, Ser. No. 704,629

10 Claims. (Cl. 208—95)

The present invention relates to a combination hydroforming and aromatics separtion process adapted to produce extremely high octane gasolines. Particularly it relates to hydroforming, separating aromatics from a selected portion of the hydroformate, and recycling the low octane paraffinic non aromatics material back to the hydroforming reactor. More particularly it relates to fractionating the hydroformate and passing only an optimum fraction of such hydroformate to aromatics separation, separating aromatics, and recycling the low octane non aromatics back to the hydroformer.

Hydroforming is a well known and widely used process for upgrading hydrocarbon fractions boiling in the motor gasoline or naphtha boiling range to increase their octane number and to improve their burning or engine cleanliness characteristics. In hydroforming the hydrocarbon fraction or naphtha is contacted at elevated temperatures and pressures and in the presence of hydrogen or hydrogen rich process gas with solid catalytic materials under conditions such that there is no consumption of hydrogen and ordinarily there is a net production of hydrogen in the process.

Hydroforming operations are ordinarily carried out at temperatures of 750°–1050° F. in the pressure range of about 50 to 1000 p.s.i.g. and in contact with such catalyst as platinum, molybdenum oxide, chromium oxide or in general oxides or sulfides of metals of groups IV, V, VI, VII and VIII of the periodic system of elements alone or generally supported on a base or spacing agent such as alumina gel, precipitated alumina or zinc aluminate spinel. A good non precious metal hydroforming catalyst is one containing about 10 wt. percent molybdenum oxide upon an aluminum oxide base prepared by heating a hydrated aluminum oxide or upon a zinc aluminate spinel. A good platinum hydroforming catalyst is one employing an alcoholate (eta) alumina base carrying 0.6% by weight of platinum. Catalysts of lower platinum content may also be used. Additionally silica alumina based catalyst can be used but it is somewhat less active.

Hydroforming may be effected by fluid bed, fixed bed or moving bed processes. In the fluid bed process, naphtha vapors are passed continuously through a dense fluidized bed of hydroforming catalyst particles in a reaction zone. Spent catalyst particles are withdrawn from the dense bed in the reaction zone and passed to a spent catalyst regeneration zone where inactivating carbonaceous deposits are removed by combustion, and the regenerated catalyst particles are then returned to the main reactor vessel. Fixed bed hydroforming of course is conducted by passing naphtha vapors through a fixed bed of catalyst and if regeneration is required, shutting down the particular reactor, purging to remove reactant vapors, withdrawing the catalyst or regenerating in situ by passing oxygen containing gas through such catalyst bed. Moving bed hydroforming is conducted by a sliding or other movement of catalyst pellets usually ⅛″ to ¼″ in diameter through the reactor vessel thus, as in fluid hydroforming, providing continuous external regeneration of the catalyst.

Aromatics separation processes are well known. Thus, for example, aromatics may be separated from a hydrocarbon stream by being selectively absorbed or adsorbed by an extracting medium. The aromatics are then removed from the extracting medium by heating, fractionation and/or by displacement with another material. The preferred absorbing materials include aqeuous diethylene glycol solution and liquid sulfur dioxide. Preferred adsorbents are 13 A. molecular sieve material, silica gel and activated charcoal. In this invention the method of aromatics separation is not critical and thus any method may, of course, be used. For example it is contemplated that a 5 A. sieve separation may be uesd to separate out the normal paraffins leaving a highly aromatic material as the raffinate.

Molecular sieves are synthetic and natural zeolites which have innumerable pores of uniform size for a particular species. Different species have pores varying in size from 3 or 4 to 15 or more Angstrom units. Almost all the adsorptive surface is within the crystal cavities to which the pores represent the only entry. 13 A. molecular sieves have pore openings large enough to admit all hydrocarbon molecules but within the cavities the polar molecules, i.e. aromatics are preferentially adsorbed thus obtaining the present desired separation. A 13 A. molecular sieve may be prepared by reaction of a sodium silicate having a high ratio of sodium to silica, e.g. sodium meta silicate with a sodium aluminate having a soda to alumina ratio of from 1:1 to 3:1, the proportion of sodium silicate solution to sodium aluminate solution being such that the ratio of silicate to alumina in the final mixture is at least 3:1 and preferably from about 4:1 to about 10:1. Preferably, the sodium aluminate solution is added to the sodium meta-silicate solution at ambient temperatures while employing rapid and efficient agitation so as to insure the formation of a precipitate having an essentially uniform composition throughout. The resulting homogeneous paste is heated to about 180° to 215° F. for a period as long as 200 hours or more to insure that the crystals thereby formed will have the desired pore size of about 13 A. After a period of heat soaking the precipitated sodium alumina silicate is filtered and water washed and then dried and activated in a calcining zone preferably at a temperature of about 700 to 900° F.

Figure 2:
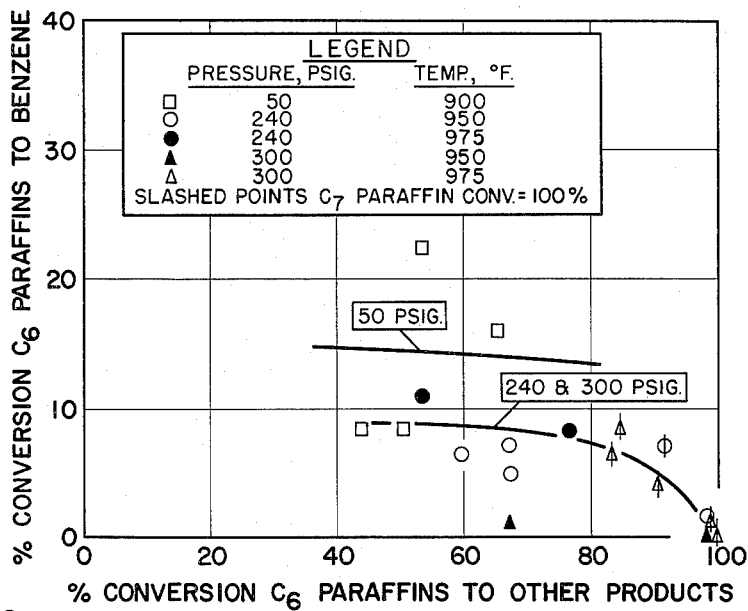
Figure 3:
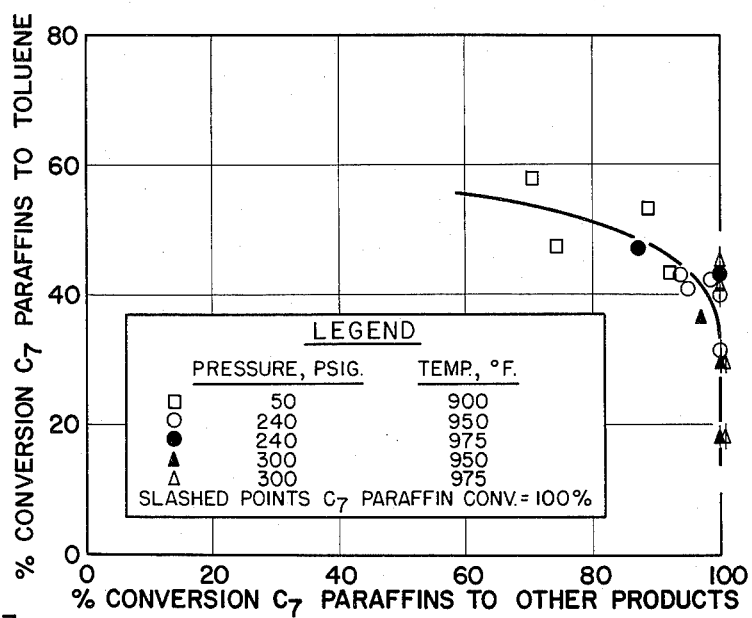

The present invention will be more clearly understood by reference to the accompanying drawing:

Fig. 1 is a diagrammatic flow plan of one embodiment of a process in accordance with the teachings of this application, Fig. 2 is a plot of data obtained by platinum hydroforming $C_6$ paraffins under different severities of operation and showing conversions to benzene at different total conversion levels, Fig. 3 is a plot of data obtained by platinum hydroforming $C_7$ paraffins under different severities of operation and showing conversions to toluene at different total conversion levels, and Fig. 4 is a plot of data obtained on two hydroformates prepared under different severities of operations and showing percent paraffins and naphthenes present in different starting temperature bottoms cuts on said hydroformates.

Referring to Fig. 1, a naphtha boiling up to about 350°–400° F. is supplied through line 1 and hydrogen-rich or recycle gas is supplied through line 6 to hydroformer reactor 2. Hydroforming is conducted at pressures of 100 to 1000 p.s.i.g. and at temperatures of 850°, 1050° F. Hydroformate and recycle gas are passed through line 3 to high pressure separator 4 where hydrogen rich recycle gas is taken overhead through line 5. Part of this recycle gas is returned to the hydroformer through line 6 and make gas is removed from the system through line 7 and valve 8. Hydroformate is passed from high pressure separator 4 through line 9 to distillation column 10. From the distillation column 10, a fraction boiling up to about 165°–180° F. is taken overhead through line 11 and is passed to gasoline blending via line 12. An intermediate fraction boiling from about 165°–300° F., preferably 165°–280° F. or 180°–300° F. is passed through line 13 to extractor 14. In extractor 14 an aqueous diethylene glycol solution, or other suitable solvent, passes down the column and takes up aromatics. Extractor 14 is operated at a temperature of about 300° F. and a pressure of about 100 p.s.i.g. Raffinate is taken overhead from column 14 through line 15 and is recycled to the hydroformer 2. The extract phase is taken from the bottom of column 14 through line 16 and is passed to stripper 17 operating at a pressure of 4 p.s.i.g. and a temperature of 300° F. Solvent is returned through line 18 to column 14 and aromatics are taken overhead through line 19 to join other streams in line 12 for blending. Referring back to column 10 heavy aromatics boiling above about 280°–300° F. are taken from the bottom of the column and passed through line 20 to gasoline blending in line 12.

The present invention presents large advantages over the prior art. Prior to the present invention it was known to extract aromatics from the entire hydroformate and to recycle the low octane paraffinic raffinate to the hydroformer. It has now been discovered that a distillation operation should be conducted prior to extraction or aromatics separation and that only an optimum heart-cut fraction of the hydroformate should be sent to aromatics extraction. Thus, by recycling only raffinate from this heart-cut fraction of the hydroformate to the hydroformer a much higher yield-octane relation is obtained than is possible from prior art processes. This heart-cut fraction should boil in the range of from about 165° to about 300° F., and preferably from 165° to 280° F. or from 180° to 300° F. Thus, over the prior art:

(1) The $C_5$ portion of the raffinate is removed because it is already relatively high in octane number and cannot be further improved by recycle reforming; and recycling of $C_5$ would be expected to decrease yield due to some cracking which would occur in the reaction train; and (2) The material boiling above 280°–300° F. is removed because it is essentially 100% aromatics and hence cannot be further improved by recycling; in addition, recycling of this material would tend to suppress the formation of aromatics in the reaction train, and there is little argument for recycling this heavy material to improve volatility since little cracking of high boiling aromatics appears to occur.

In summary, by this invention the size of the hydroformer may be reduced due to the decreased volume of raffinate recycled, and overall catalyst selectivity to aromatics is improved.

According to the present invention the overhead from the distillation column should boil up to about 165°–180° F. This fraction contains $C_5$ hydrocarbons which are already high in octane number and which cannot be further improved by recycle hydroforming and $C_6$ acyclic hydrocarbons which although of poor octane quality cannot be much improved by further hydroforming. That the $C_6$ hydrocarbons should not be passed to aromatics extraction and thence back to hydroforming can be seen from the attached Fig. 2. Fig. 2 is a plot of data obtained by platinum hydroforming $C_6$ paraffins under different conditions of temperature and pressure but with constant feed rate, platinum catalyst, and amount of recycle gas. Inspections on the hydroformate are then made to determine the amount of $C_6$ paraffins remaining unconverted and the amount of benzene produced present therein. From these data for each percent conversion of $C_6$ paraffins to other products the corresponding percent conversion of those paraffins to benzene was plotted. Two smooth curves, one for the data at 50 p.s.i.g. and one for all the data at both 240 and 300 p.s.i.g. were then drawn through these points. Thus, at 240 and 300 p.s.i.g. the $C_6$ hydrocarbons, boiling to 156° F., are converted to aromatics to the extent of only about 10%, an amount not economically, in view of the costs, worth obtaining. Additionally, recycling of these $C_6$ hydrocarbons would be expected to decrease yield due to cracking occurring in hydroforming.

From Fig. 3 on the other hand, it can be seen that $C_7$ hydrocarbons, can be extracted and recycled to hydroforming while obtaining good yields. This Fig. 3 also is a plot of data obtained by platinum hydroforming this time $C_7$ paraffins under different conditions of temperatures and pressures. Again a similar type analysis was made on the hydroformate and percent conversions of $C_7$ paraffins to other products were plotted against percent conversions of these paraffins to toluene. This time it was possible to draw a single smooth curve through the points for all the pressures utilized. In the figure it is shown that $C_7$ hydrocarbons are converted to aromatics in hydroforming to the extent of about 50%. This is a very high conversion to aromatics and it is therefore highly desirable to extract these $C_7$'s and to pass the raffinate back to the hydroforming reactor. The optimum cut point is therefore positioned between these temperatures.

From Fig. 4 it is seen that bottoms from the column should boil above about 290° F. This Fig. 4 is a plot of data obtained (a) from the platinum hydroforming of a 168/310° F. virgin naphtha from Arabian crude to 95 Research Clear Octane Number and (b) a 200/325° F. mixed virgin naphtha from Louisiana and West Texas crudes to 99 Research Clear Octane Number. The hydroformates obtained were then fractionated and different bottoms cuts whose boiling points start at from 180° to 300° F. are then analyzed for both vol. percent of paraffins and vol. percent of naphthenes present in said bottoms cuts. From Fig. 4 it is seen that above about 290° F. only about 0.2% of naphthenes and about 1% of paraffins in the hydroformate and also that this point appears to be critical in that the percentages of these components present increases rapidly for cut point temperatures below this point. Thus, since this material is essentially 100% aromatics it is not desired to have it taking up space in the extractor nor to have the expense of separating these aromatics from the extracting medium unnecessarily. Additionally, or alternatively, it is not desirable to recycle this material (1) since recycling cannot improve it even with regard to improving volatility since little cracking of high boiling aromatics occurs in hydroforming and (2) since the presence of these aromatics in hydroforming tends to suppress the conversion of other components to aromatics.

The following example is illustrative of the present invention.

*Example*

A wide cut naphtha obtained from Louisiana and West Texas crude boiling in the range of 200° to 325° F. and having 55 Research Clear Octane Number is hydroformed by contacting with a catalyst comprising 0.6% platinum deposited on alcoholate alumina at an equivalent isothermal temperature of about 900°–920° F. at a pressure of 300 p.s.i.g., a feed rate of 3 wts. of total naphtha feed/hr./wt. of catalyst and in the presence of 6000 cubic feet of recycle hydrogen per barrel of feed. Hydroformate is passed to distillation and an overhead cut boiling to about 170° F. and a bottoms cut boiling above 290° F. are passed to gasoline blending. A 170°–290° F. intermediate cut is passed to aqueous diethylene glycol extraction at 100 p.s.i.g., the solvent used is aqueous diethylene glycol and solvent circulation is 6 barrels of solvent per barrel of feed. In the system the extractor is operated at 300° F. and the stripper at 300° F. Recycle of raffinate to the reforming zone amounts to 71% on fresh feed to the process. Extract yield is 45% on feed to the extractor. The combined stream gasoline product from the process has a Research Clear Octane Number of 103.5 C.R.C.

The foregoing description contains only one embodiment of the present invention. It will be understood, however, that this invention is not limited thereto since numerous variations are possible without departing from the scope of the following claims.

What is claimed is:

1. The process for producing from a wide boiling naphtha an extremely high octane gasoline which comprises the steps of hydroforming the naphtha feed at 850° to 1050° F., passing hydroformate to distillation, separating overhead a cut boiling below about 165° F., containing $C_6$ paraffins low in octane number, separating as bottoms a cut boiling above about 300° F., passing overhead and bottoms to gasoline blending, passing the intermediate cut boiling in the range of 165° to 300° F. to aromatics separation, separating aromatics from said intermediate cut, passing non-aromatics material from said intermediate cut back to hydroforming with said feed at 850° to 1050° F., and passing separated aromatics of the intermediate cut to gasoline blending with the other fractions boiling below about 165° F. and above about 300° F. from the distillation step.

2. The process for producing from a wide boiling naphtha an extremely high octane gasoline which comprises the steps of hydroforming the naphtha feed at 850° to 1050° F., passing hydroformate to distillation, separating overhead a cut boiling below about 165° F., containing $C_6$ acyclic hydrocarbons of poor octane quality, separating as bottoms a cut boiling above about 280° F., passing overhead and bottoms to gasoline blending, passing the intermediate cut boiling in the range of 165° to 280° F. to aromatics separation, separating aromatics from said intermediate cut, passing non-aromatics material from said intermediate cut back to hydroforming with said feed at 850° to 1050° F. and passing separated aromatics of the intermediate cut to gasoline blending with the other fractions boiling below about 165° F. and above about 280° F. from the distillation step.

3. The process for producing from a wide boiling naphtha an extremely high octane gasoline which comprises the steps of hydroforming the naphtha feed at 850° to 1050° F., passing hydroformate to distillation, separating overhead a cut boiling below about 180° F., containing $C_6$ acyclic hydrocarbons of poor octane quality, separating as bottoms a cut boiling above about 300° F., passing overhead and bottoms to gasoline blending, passing the intermediate cut boiling in the range of 180° F. to 300° F. to aromatics separation, separating aromatics from said intermediate cut, passing non-aromatics material from said intermediate cut back to hydroforming with said feed at 850° to 1050° F. and passing these aromatics of the intermediate cut from the aromatics separation step to gasoline blending with the other fractions boiling below about 180° F. and above about 300° F. from the distillation.

4. The process as in claim 1 in which the aromatics are separated by liquid extraction.

5. The process as in claim 2 in which the aromatics are separated by liquid extraction.

6. The process as in claim 3 in which the aromatics are separated by liquid extraction.

7. The process as in claim 1 in which the aromatics are separated by adsorption on 13 A. molecular sieve material.

8. The process as in claim 2 in which aromatics are separated by adsorption on 13 A. molecular sieve material.

9. The process as in claim 3 in which aromatics are separated by adsorption on 13 A. molecular sieve material.

10. The process for producing from a wide boiling naphtha an extremely high octane gasoline, which comprises the steps of hydroforming the naphtha feed in the presence of a catalyst comprising platinum on eta alumina at a temperature in the range of 850° to 1050° F. under a pressure of 100 to 1000 p.s.i.g. in a hydroforming reaction zone, passing resulting hydroformate from said reaction zone to a distillation zone, separating from the hydroformate in said distillation zone a cut boiling below 165° F., an intermediate cut boiling from 165° to 280° F. and a bottoms cut boiling above 280° F., passing the intermediate cut to an aromatics separating zone wherein non-aromatic hydrocarbons are separated from aromatic hydrocarbons of said intermediate cut, passing separated non-aromatic hydrocarbons of said intermediate cut back to the hydroforming zone for hydroforming under the same conditions with the naphtha feed, and blending the aromatics separated from the intermediate cut with the low boiling cut and bottoms cut of the distillation.

References Cited in the file of this patent

UNITED STATES PATENTS

| | | |
|---|---|---|
| 2,651,597 | Corner et al. | Sept. 8, 1953 |
| 2,697,684 | Hemminger et al. | Dec. 21, 1954 |
| 2,818,449 | Christensen et al. | Dec. 31, 1957 |
| 2,834,429 | Kinsella et al. | May 13, 1958 |
| 2,840,620 | Gerhold et al. | June 24, 1958 |
| 2,880,164 | Viland | Mar. 31, 1959 |
| 2,888,394 | Christensen et al. | May 26, 1959 |